Nov. 1, 1927.  
M. B. LONG  
1,647,236  
ELECTRICAL TESTING SYSTEM  
Filed May 29, 1922
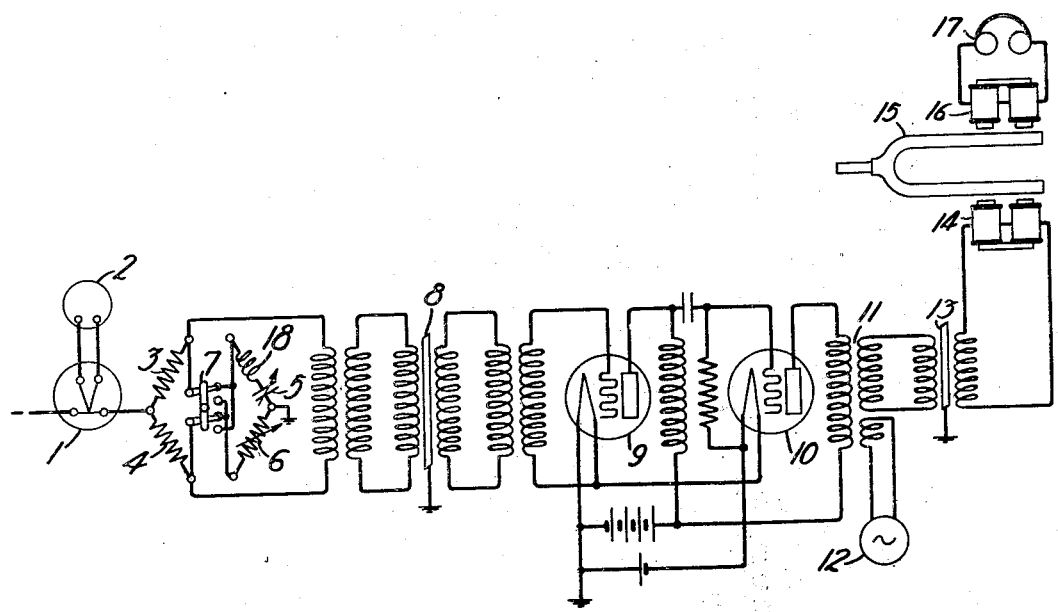
Inventor:  
Maurice B. Long.  
by Joel H. Palmer Att'y.

Patented Nov. 1, 1927.

1,647,236

UNITED STATES PATENT OFFICE.

MAURICE B. LONG, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRICAL TESTING SYSTEM.

Application filed May 29, 1922. Serial No. 564,354.

This invention relates to electrical testing systems and particularly to systems for measuring the impedance of electrical apparatus.

It is an object of the invention to provide new and improved means for making impedance measurements at relatively low frequencies.

More specifically, the invention relates to a novel detector circuit employing a low frequency bridge in which the apparatus to be tested is included and in the output circuit of which is included a selective detector. The current of the frequency at which the measurement is to be made is applied to the bridge in the usual manner. The bridge output is amplified and then modulated by a current the frequency of which is such that one of the products of modulation, i. e., the sum or difference term, will be of some definite predetermined value, such as 1000 cycles. This frequency current together with the other components, due to harmonics, etc., is then applied across a detector which is selectively responsive only to the predetermined modulated frequency current, such as 1000 cycles. A 1000 cycle note will be heard in a telephone receiver or other suitable indicator placed across this coil. When the bridge is balanced by means of suitable adjusting mechanisms, this sound will be reduced to zero, and the impedance measurements may be computed therefrom.

Other objects and features of the invention, the principles of operation, and the particular arrangements which are believed to be most desirable, will appear from the following description taken in conjunction with the accompanying drawing, which illustrates the preferred form of selective transmission circuit tuned to a single frequency.

In the drawing, a thermo-couple 1 is placed in the input circuit of the system in parallel with a meter 2, for the purpose of measuring the input current. The low frequency measuring bridge comprises a pair of fixed resistance arms 3 and 4, and a pair of adjustable arms which include respectively an adjustable capacity 5, and an adjustable resistance 6, connected to the fixed arms by a two-pole switch 7. There is also provided a transformer or a plurality of transformers 8, which may be of the grounded shield type, the primary of which is in circuit with the bridge. The secondary of the transformer 8 is in circuit with a pair of amplifiers 9 and 10, connected in series in the usual manner. The output circuit of the amplifiers is connected in circuit with the primary of a transformer 11 which is provided with secondary and tertiary windings. The tertiary winding of the transformer 11 is connected in circuit with a source of alternating current 12 adapted to run at a definite predetermined rate to form with the windings of the transformer 11 a modulator or frequency combiner to increase or decrease the frequency of the current in the secondary circuit to a definite predetermined value. The secondary winding of the transformer 11 is coupled with a grounded shield transformer 13, the secondary of which is in circuit with the electromagnet 14 of a suitable detector. The modulated frequency generated in the windings of an electromagnet 14 of such a detector is adapted to actuate a suitable indicating instrument, which, in the present case, is a highly selective tuning fork 15. A pair of output coils 16 are situated near the opposite prong of the tuning fork and are connected in series with a telephone receiver 17. This detector is especially useful since it is responsive to a much narrower band of frequencies than detectors used heretofore. It is especially adaptable for use in connection with low frequency bridges where the frequency of the input current is below 500 cycles, since, in such cases, harmonics are not readily eliminated by filters of the resonant circuit type and the ear is less sensitive to the lower frequencies, its sensitivity decreasing rapidly with the decrease in frequency. The components of the current applied to the detector are currents of the input frequency, the modulator frequency, their frequency difference, their frequency sum and the harmonics of each, but the tuning fork being very selective may be adjusted to respond to only one of these preferably either the difference frequency or the sum frequency, one of which may be made about 1000 cycles per second, the frequency at which the average ear is believed to be the most sensitive.

The operation of the system is as follows:
An electrical coil 18, whose impedance it is desired to test, is inserted in a variable arm of a Wheatstone bridge, in this case in series with the adjustable condenser 5. The current of a frequency at which the measurement is to be made is applied to the bridge through the heating element of the thermocouple 1. The current output of the bridge is amplified and then modulated as described above, with a frequency of such value that one of the products of modulation will be 1000 cycles. The tuning fork 15 will be actuated by the modulated frequency to generate a current in the output coils 16, and consequently in the circuit of the receiver 17, at the modulated frequency. A 1000 cycle note will then be heard in the telephone receiver since this is the only frequency which actuates the tuning fork. With the receiver to his ear, the operator manipulates the adjustable condenser 5 and the adjustable resistance 6 until finally the sound in the telephone receiver 17 is reduced to zero. When such a condition exists the bridge is balanced. A reading is then taken of the adjustable condenser and resistance and the impedance of the coil under test is computed therefrom. When such a reading is determined the two-pole switch may be moved to its alternate position and a similar reading taken. This is sometimes rendered necessary by the presence of slight defects in the fixed resistance arms 3 and 4. If these be absolutely pure resistance of constant ratio it will not be necessary to take a second reading, but if they are thought to vary in any manner the average impedance measurements taken in the two positions will give a true impedance reading for the apparatus on test.

Although the invention has been shown and described as applicable to making impedance measurements, it will be obvious that the general principles may be embodied in many other organizations, widely differing from those illustrated, without departing from the spirit of the invention, as defined in the following claims.

What is claimed is:

1. In combination, a measuring bridge having input and output circuits, means for combining a current in said output circuit with a current of known frequency to produce a current of third known frequency, a mechanically resonant selective means for detecting only the current of the third known frequency, and means for observing the effects of said third known frequency.

2. In an electrical system, a measuring bridge having input and output circuits and adapted to include electrical apparatus to be tested, a current modulator for increasing or decreasing a frequency of the output current to a predetermined audible value, an electromagnetic detector for detecting only the current of the modulated frequency, a telephone receiver, and means responsive to said detector for producing audible sound in said telephone receiver, whereby the adjusting of said bridge may be gauged.

3. In an electrical system, a measuring bridge having input and output circuits and adapted to include electrical apparatus to be tested, means for amplifying the output current, a current modulator for increasing or decreasing the frequency of said amplified current to a predetermined audible value, a tuning fork responsive only to current of the modulated frequency, an electromagnet for operating said tuning fork, a second electromagnet associated with said tuning fork, and a receiver connected to said second magnet for observing the vibrations of said fork.

In witness whereof, I hereunto subscribe my name this 26th day of May A. D., 1922.

MAURICE B. LONG.